Nov. 2, 1965 M. E. GINAVEN 3,214,796
PELLETIZER
Filed April 17, 1962
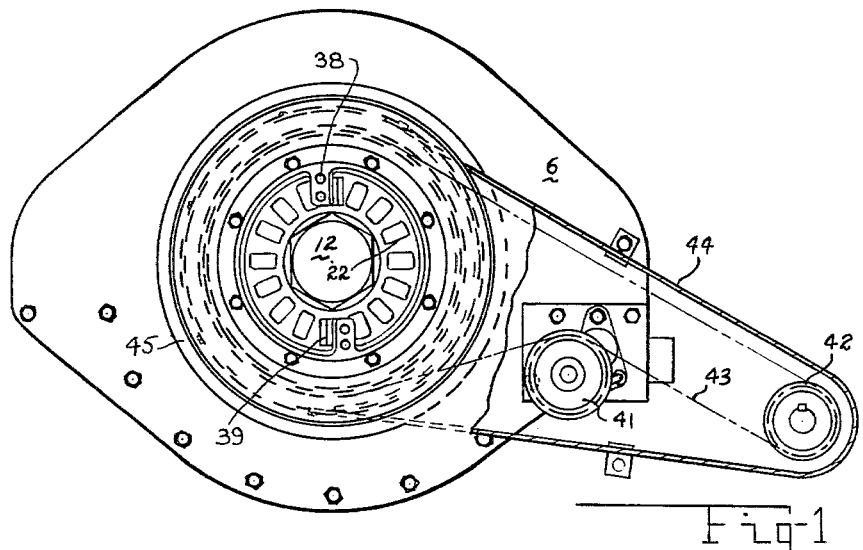
Fig-1
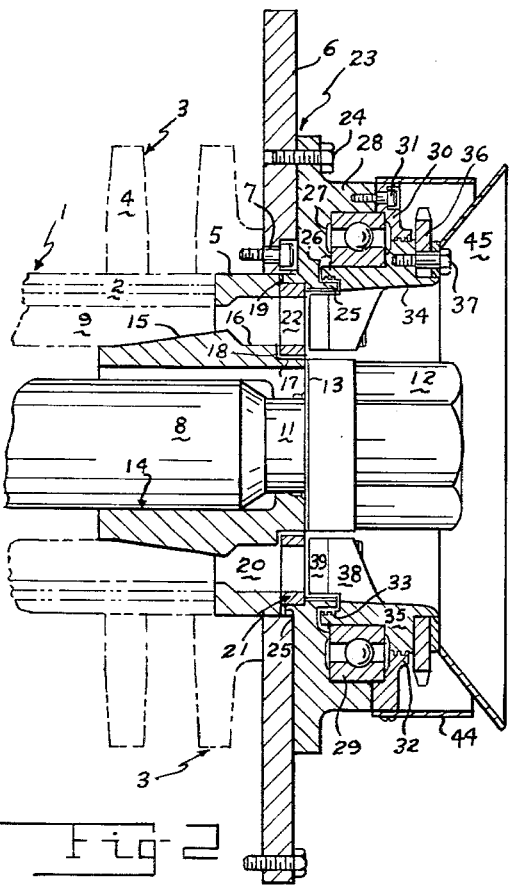
Fig-2
Fig-3
INVENTOR.
MARVIN E. GINAVEN
BY Tom Walker
ATTORNEY 3,214,796
PELLETIZER
Marvin E. Ginaven, Springfield, Ohio, assignor to The Bauer Bros. Co., Springfield, Ohio, a corporation of Ohio
Filed Apr. 17, 1962, Ser. No. 188,469
9 Claims. (Cl. 18—12)

This invention relates to a pelletizing unit which is particularly advantageous as an attachment for a screw press. In the latter form it enables a significant advance in the art of producing synthetic rubber and will be so described. However, it should be kept in mind that neither the form of its embodiment nor the area of its application is so limited.

In processing synthetic rubber it eventually reaches a moisture laden crumb condition, embodied in a slurry type vehicle. At this point the crumb is normally dewatered, then ground and finally dryed. The grinding procedure is objectionable in that it produces fines. These fines create sticky deposits in the processing equipment which necessitates costly and frequent maintenance procedures. In addition, they produce health hazards. However, objectionable though the grinding procedure may be, it has been continued in the belief that it is essential in the production of synethic rubber.

The present invention provides a pelletizing unit which, when applied as an attachment to a screw press such as a "pressafiner," eliminates the need for the objectionable grinding phase in the processing of synthetic rubber. A feature of its use is that it provides for better control of the porosity and density of the dewatered crumb. Moreover, its structural embodiment is exceedingly simple in form and therefore economical to fabricate. Embodiments are quite versatile in that their effect can be quickly altered by a simple die interchange.

A primary object of the invention is to provide improvements in pelletizers rendering them economical to fabricate, more efficient and satisfactory in use, adaptable to a wide variety of applications and easier to maintain.

A further object of the invention is to provide an improved pellet making attachment for screw presses and similar equipment.

Another object of the invention is to provide a simpler and more effective device for pelletizing plastic materials.

An additional object of the invention is to provide improvements in dewatering equipment.

Another object of the invention is to provide means for eliminating costly and objectionable grinding procedures in the processing of synthetic rubber and the like.

A further object of the invention is to provide a simple means for selectively controlling the porosity and density of moisture laden materials.

A further object of the invention is to provide pelletizing equipment possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof and the mode of operation as hereinafter described or illustrated in the accompanying drawings, or their equivalents.

Referring to the accompanying drawing, wherein is shown one but obviously not necessarily the only form of embodiment of the invention, FIG. 1 is an elevation view of the discharge end of a pelletizer unit in accordance with the invention;

FIG. 2 is a cross-sectional view of the device of FIG. 1 incorporated in a "pressafiner"; and FIG. 3 is a cross-sectional view of a cutter element.

Like parts are indicated by similar characters of reference throughout the several views.

The present invention can be best described with particular reference to the accompanying drawings. The embodiment illustrated is incorporated in a "pressafiner" and will be described as a medium for dewatering synthetic rubber delivered in a crumb form. The details of the press are limited to those elements considered essential to providing a complete disclosure of the present invention.

Noting FIG. 2 of the drawings, the pressafiner is schematically illustrated to include a cage 1 conventionally formed of bars 2 confined in circularly spaced relation by clamps 3 to form apertures for escape of released fluids. Each of the clamps 3 is provided by a pair of semicircular ribbed elements 4. In the embodiment illustrated a clamp 3' at the discharge end of the cage 1 axially projects to peripherally confine a portion of a ring 5. The ring 5 is positioned in end abutting relation to the cage 1 and projects relative the clamp 3' to nest within an aperture in the plate 6 secured to the outer face of the clamp 3' by screws 7. The interior diameter of ring 5 is equal to that of the cage 1 at its portion immediately adjacent thereto and expanded therebeyond. The ring 5 thereby provides an extension of the cage 1 and a relative expansion of the passage therefrom.

The pressafiner is shown to include an operating shaft 8 oriented on the longitudinal axis of the cage 1. Within the cage, the shaft 8 conventionally mounts a series of successively positioned conveying and squeezing elements (not shown) which define a flow passage 9 thereabout. The shaft 8 projects beyond the cage 1 and through the ring 5. Its projected extremity 11 is relatively reduced to threadedly mount a nut 12. A shim 13 and a sleeve 14 are interposed on the shaft 8 between the nut 12 and the conveying and squeezing elements in the cage 1. The sleeve 14 is keyed to the shaft 8 and on appropriate adjustment of the nut 12 is clamped in end abutting relation to the elements on the shaft 8. The conveying and squeezing elements are thereby positioned to establish a fixed configuration for the flow passage 9 thereabout. One end portion 15 of the sleeve 14 has a conical exterior. The portion 15 is formed to provide a gradual reduction of the cross-sectional area of the passage 9 from the last of the squeezing and conveying elements in the cage 1 to a plane perpendicular to the shaft 8 within the ring 5, beyond which the interior diameter of the ring 5 is relatively expanded. Beyond the sleeve portion 15, the sleeve is successively reduced in cross-section to provide a cylindrical portion 16 and a reduced cylindrical extremity 17. The portions 16 and 17 are connected by an annular shoulder 18 which is coplanar with the projected face of the ring 5. The cage 1 and ring 5 in conjunction with the portions 15 and 16 of the sleeve 14 thereby define an extension of the flow passage 9 which is reduced to a minimum from a point within the cage to a point adjacent thereto in the ring 5 and suddenly expanded to a uniform cross-sectional area therebeyond. The extension of the flow passage 9 within the ring 5 is defined by the numeral 20 in FIG. 2 of the drawings.

The projected extremity 17 of the sleeve 14 mounts an annular die plate 21 having the inner peripheral portion of one face in abutment with the shoulder 18 and its outer peripheral portion in end abutting relation to the inner peripheral portion of the ring 5. The plate 21 is provided with a series of circularly spaced radially oriented generally rectangular apertures 22. The apertures 22 are positioned in direct alignment with the passage 20 from the ring 5 and have a radial extent coextensive therewith. The plate 21 has a depth providing that it relatively project with respect to the outer face of the plate 6. Moreover, the outer periphery of the plate 21 is in concentric spaced relation to the inner peripheral portion of the plate 6 and thereby defines an annular pocket 19 therebetween.

The die plate 21 is clamped in its end abutting relation to the shoulder 18 and the ring 5 by a centrally apertured plate 23 secured to the plate 6 by screws 24. The inner peripheral portion 25 of the plate 23 is formed to overlap the outer peripheral portion of the plate 21 and thereby maintain its confinement. The plate 23 further includes a tubular projection 25' nesting in the pocket 19 between the plate 6 and die plate 21 to insure the peripheral confinement of the plate 21 and the maintenance of the apertures 22 in direct alignment with the portion of the passage 20 opening from the ring 5.

The face of the plate 23 outermost from the plate 6 has a circular recess 26 immediately about its inner peripheral portion 25, which is thereby formed to provide a tubular projection. The outermost face of the plate 23 includes an intermediate recess 27 in concentric spaced relation to the recess 26 and spaced outwardly thereof a concentric tubular projection 28.

Immediately confined by the tubular projection 28 is a ball bearing 29, one face of which is positioned so its outer race abuts the outer face of plate 23 immediately outward of the recess 27 and its inner race abuts the plate 23 immediately inward of recess 27. A retainer ring 30 is secured over the projected face of the tubular portion 28 of the plate 23 by screws 31. The retainer 30 is formed to overlap and contain the outer race of the bearing 29 to the plate 23. Its inner peripheral portion 32 is offset outwardly of the bearing 29 and terminates intermediate its inner and outer races.

A tubular member 34 projects through and mounts the inner race of bearing 29. The one end of the element 34 is stepped to provide an annular shoulder at its inner periphery opposed to the inner peripheral portion 25 of the plate 23 and a portion 33 which projects in recess 26 about and in bearing relation to the tubular projection defined by the inner peripheral portion 25. The outermost portion 35 of the tubular element 34 is radially expanded to contain the inner race of bearing 29 to the plate 23 and effect a bearing relation to the inner periphery of the portion 32 of the bearing retainer 30. The tube 34 is thereby radially confined by the inner peripheral portion 25 of the plate 23 and the inner peripheral portion 32 of the bearing retainer 30. A suitable lock ring is provided about the tube 34 to contain the inner race of bearing 29 to the shoulder provided by the radially expanded portion 35 of the tube 34. In this way the tube 34 is restrained from movement axially with respect to the bearing 29.

At its outermost face the inner peripheral portion of the tube 34 is relatively projected to mount a sprocket 36 secured by screws 37 to the projected face of the tube portion 35.

The inner surface of the tube 34 provides a slight conical expansion of the aperture defined by the inner peripheral portion of the plate 23 which confines the die plate 21.

Mounted on the inner surface of the tube 34 immediately adjacent the plate 23 are a pair of diametrically opposite mounting flanges 38. The flanges 38 project radially inward of the member 34 to present coplanar mounting surfaces in spaced parallel relation to the plate 21 and in alignment with apertures 22 therein. The mounting faces of the flanges 38 opposite apertures 22 have cutting blades 39 fixed thereon. The faces of the cutting blades 39 adjacent the plate 21 are parallel thereto and their leading edge 40 is sloped in the direction thereof.

As shown in FIG. 1 of the drawings, the plate 6 has radial extended portions, one of which mounts an idler sprocket 41. As contemplated by the present invention, structure may be suitably provided in connection to the pressafiner to mount a motor 42. A chain drive 43 from the motor 42 in the plane of the sprocket 36 and in engagement therewith serves as a medium for driving the sprocket 36 and the tube 34 thereby. The idler sprocket 41 is intermediately engaged to the chain 43 and may be suitably adjusted to provide proper tension thereon in drive of the tube 34. The drive from the motor 42 to the sprocket 36 is suitably protected by a guard plate 44 the ends of which connect to diametrically opposite peripheral portions of the bearing retainer 30. The guide 44 is stabilized by suitable connection to the plate 6 and the pressafiner structure per se.

Secured to the outermost face of the sprocket 36 is a relatively projected conically expanded funnel 45. It may be readily seen that upon energization of the motor 42 the tube member 34 will be driven to move in a circular path adjacent apertures 22 and die plate 21.

As mentioned previously, the invention embodiment above described is admirably suited for use in dewatering synthetic rubber. In operation, synthetic rubber is delivered to the intake of the pressafiner in a crumb condition embodied in a slurry. As this is moved through the cage 1, the conveying and squeezing elements on the shaft 8 successively function to provide a staged extraction of the fluid vehicle as well as fluid embodied in the crumb. The form of the sleeve 14 at the discharge extremity of the cage 1 and within the cage extension 5 functions to reduce the flow passage 9 and thereby introduces a back pressure in the cage which insures an optimum working of the crumb therein. The reduction of the flow passage 9 as it communicates with the passage 20 defined by the ring 5 provides a terminal squeezing operation subsequent to which the dewatered crumb moves into the expanded portion of the passage 20 in the ring 5. From the discharge end of the passage 20 the dewatered material is threaded through the apertures 22 in the die plate 21. As the plurality of threads move from the die plate 21 they are intercepted by the cutting edges 40 on the diametrically spaced cutting elements 39. As is of course obvious, the motor 42 is in an energized condition at this point driving the tube 34 through the medium of the chain 43 and sprocket 36. As the tube rotates, the cutting edges of the elements 39 turn to successively intercept the threads of synthetic rubber material moving through the apertures 22, cutting them into small pellets in the process. It should be obvious that the die plate 21 may be easily interchanged and a die plate substituted which has apertures 22 of different size to thereby control the size and form of the pellets which result.

The described structure functions to reduce the crumb to a condition and dewater it to an extent that it may be directly transmitted to a drier without an intermediate grinding procedure being necessary. Moreover, its components are so simply and effectively correlated to not only produce optimum results but to enable an economy of investment and operation for purposes as described. The versatility of the described structure is believed readily apparent from the fact that the plate 21 may have its apertures so sized and formed not only to control pellet size but also to effect the back pressure introduced on material in the flow passage through the cage 1. A further feature in the operation of the described structure is that by controlling the speed of cutter rotation one may readily control the intervals at which the cutters intercept the threads issuing through the die plate 21.

It should now be obvious that the invention apparatus produces, in a simple fashion, a better and more effective control of the porosity and density of the dewatered crumb passed through a screw press or similar equipment. The flexibility of the control provided assumes significant proportion when it is considered that the porosity and density of crumb which may be desired varies greatly with different types of polymers which are regularly manufactured. An important side effect of the invention is the elimination of a need for a grinding or milling procedure in the production of synthetic rubber and the hazards incident thereto.

The invention has been described with reference to a limited embodiment and application. However, it should now be apparent that the pelletizer attachment has utility per se and advantages in other form and application.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A press for treating synthetic rubber or like material in a moisture laden crumb condition carried in a liquid slurry, including a press cage receiving the slurry and carried material, said cage being formed of spaced bars for escape of fluids from the cage, means for conducting the material toward one end of said cage while applying pressure thereto for expression of fluids, said means including a rotary shaft projecting through and beyond said one end of said cage, an annular extension mounted to said cage at said one end thereof in surrounding spaced relation to said shaft, a sleeve connected to said shaft for unison rotary motion in radially spaced relation to said extension member, said sleeve and said extension member having complementary configurations providing a cage discharge opening at said one end thereof and beyond said opening an annular passage enlarged relative to said discharge opening forming an expansion chamber, an annular die plate seated on said extension member and closing said annular passage, said sleeve having an inset portion receiving said plate at its inner periphery, said plate having a series of openings aligned with said passage, means for holding said plate to its described seat, rotary means having a bearing on said last named means cooperating with said shaft to define a continuation of said annular passage beyond said plate, and cutter elements on said rotary means movable in said continuation of said annular passage to sever into pellet form material issuing through the openings of said plate.

2. A press according to claim 1, characterized in that said rotary means has the character of a tubular member, said cutter element being mounted on the inner periphery thereof to project transversely of the openings in said die plate toward said shaft.

3. A press according to claim 1, characterized by means on said shaft confining said sleeve against endwise motion through and beyond said cage, said means having an outer periphery parallel to the axis of said shaft while the inner periphery of said tubular member is in outwardly flaring relation to said shaft axis.

4. A press according to claim 1, characterized by a mounting member secured to said cage at said one end thereof, said mounting member having a center opening receiving said annular extension member and providing a mount for the said means holding said die portion to its seat on said extension member.

5. A press according to claim 4, characterized by means on said mounting member connected in a rotary driving relation to said rotary means independently of said shaft.

6. A pelletizing attachment for the apertured cage of a screw press or the like housing screw means forming therewith a flow passage comprising, means for attachment at the discharge end of the screw means to limit the discharge from said flow passage, means for connection to the discharge end of said cage forming an extension thereof and together with said attached means an extension of said flow passage, said passage extension being formed to first provide a reduction of said flow passage and then provide an expansion thereof to its discharge extremity, a die plate blocking said discharge extremity including spaced apertures communicating with the flow passage, said plate being arranged to produce a back pressure on materials in said flow passage and to convert the materials discharged therefrom into thread-like elements and means mounting adjacent said die plate and rotatable about the elements which issue therefrom to successively cut them and convert them to a pellet size.

7. Dewatering equipment including an apertured press cage having therein a longitudinally extended drive shaft mounting, squeezing and conveying elements which define a flow passage with said cage, conical sleeve means mounting on said shaft to reduce said flow passage at the discharge end of said cage and project therebeyond, means in connection with said cage extending about the projected portion of the conical sleeve to form therewith an extension of said flow passage which is first reduced and then relatively expanded in cross sectional area, a die plate interposed in the path of the discharge extremity of the relatively expanded portion of said passage extension operative to produce a back pressure within said passage and formed to convert the discharge issuing therefrom to thread-like elements and spaced cutter elements rotating peripherally of said thread-like elements arranged to intercept said elements and reduce them to segment form as they pass from said die plate.

8. A screw press or the like including an apertured cage having means therein forming therewith a flow passage for movement therethrough of moisture laden material in a crumb condition from an entrance opening to its discharge extremity, means interconnected to provide an extension of said flow passage which first reduces the flow passage at the discharge extermity of the cage and then expands the passage beyond said cage discharge extremity, a die plate interposed to block the projected extremity of the means providing said extension of said flow passage and present spaced apertures in alignment therewith, rotating tube means mounted to provide a channel element beyond said die plate, said tube means incorporating circularly spaced cutter elements arranged to move in a plane immediately adjacent said die plate and to successively intercept material which threads through the apertures of said die plate.

9. Dewatering equipment comprising, an apertured cage having means therein defining therewith a flow passage, said means having elements thereon operative in conjunction with said cage to successively squeeze materials in said flow passage and convey said materials therefrom, means interconnected to reduce said flow passage to a minimum at the discharge extremity of said cage and to provide an expanded extension of said flow passage therebeyond, means at the relatively expanded extended portion of said flow passage operative to produce a back pressure in said flow passage and formed to convert the materials discharged therefrom to thread-like elements and spaced cutter elements rotatable about the thread-like elements to convert them to a segmented form.

References Cited by the Examiner
UNITED STATES PATENTS

| | | | |
|---|---|---|---|
| 1,102,301 | 7/14 | Sizer | 100—145 |
| 1,604,662 | 10/26 | Royle. | |
| 1,684,203 | 9/28 | Royle. | |
| 1,724,967 | 8/29 | Royle. | |
| 1,768,365 | 6/30 | MacFarlane. | |
| 1,862,947 | 6/32 | Smith et al. | 18—13 |
| 1,946,740 | 2/34 | Hall. | |
| 2,370,952 | 3/45 | Gordon | 18—12 |
| 2,705,927 | 4/55 | Grooves et al. | 18—12 |
| 2,728,943 | 1/56 | Hertz et al. | 18—12 |
| 2,994,105 | 8/61 | Seal et al. | 18—12 |
| 3,025,564 | 3/62 | Voigt | 18—12 |

WILLIAM J. STEPHENSON, *Primary Examiner.*

MICHAEL V. BRINDISI, *Examiner.*